United States Patent [19]
Yamamoto et al.

[11] Patent Number: 5,198,163
[45] Date of Patent: Mar. 30, 1993

[54] EXPANSION MOLDING METHOD

[75] Inventors: Ken Yamamoto; Masaru Harao, both of Koga; Hideo Takamatsu, Ibaraki, all of Japan

[73] Assignee: Sekisui Kaseihin Kogyo Kabushiki Kaisha, Nara, Japan

[21] Appl. No.: 772,089

[22] Filed: Oct. 7, 1991

[51] Int. Cl.$^5$ .............................................. B29C 67/22
[52] U.S. Cl. ..................................... 264/51; 264/321; 264/328.7
[58] Field of Search .......... 264/45.4, 51, 53, DIG. 10, 264/321, 328.7

[56] References Cited

U.S. PATENT DOCUMENTS

| | | | |
|---|---|---|---|
| 3,013,304 | 12/1961 | Richie et al. | 264/DIG. 10 |
| 3,030,668 | 4/1962 | Taylor | 264/DIG. 10 |
| 3,122,787 | 3/1964 | Adams | 264/DIG. 10 |
| 3,351,978 | 11/1967 | Kraus et al. | 264/DIG. 10 |
| 3,852,390 | 12/1974 | Harrison | 264/53 |
| 3,897,899 | 8/1975 | Schuff et al. | 264/DIG. 9 |
| 4,424,180 | 1/1984 | Lalloz et al. | 264/51 |
| 4,758,394 | 7/1988 | Yaita et al. | 264/51 |

FOREIGN PATENT DOCUMENTS

| | | |
|---|---|---|
| 53-30741 | 8/1978 | Japan |
| 62-10175 | 3/1987 | Japan |
| 63-153119 | 6/1988 | Japan |

Primary Examiner—Allan R. Kuhns
Attorney, Agent, or Firm—Nikaido, Marmelstein, Murray & Oram

[57] ABSTRACT

A method of forming molded articles having consistently or partially thin-walls by expanding expandable thermoplastic resin beads in a cavity formed between molds with the application of heat. The introduction of the resin beads is carried out after causing the width of a circumference section of the cavity to be greater than the diameter of the beads by moving one of or both of the molds in at least one direction orthogonal to a direction of closing the molds, the molds are then moved back to the normal positions, and the introduced resin beads are heated to form the molded article. Also, an expansion molding apparatus having a moving device such as a cylinder which moves the molds in at least one direction orthogonal to the closing direction during the introduction of the expandable thermoplastic resin beads, whereby consistently or partially thin-walled molded articles are manufactured.

5 Claims, 15 Drawing Sheets

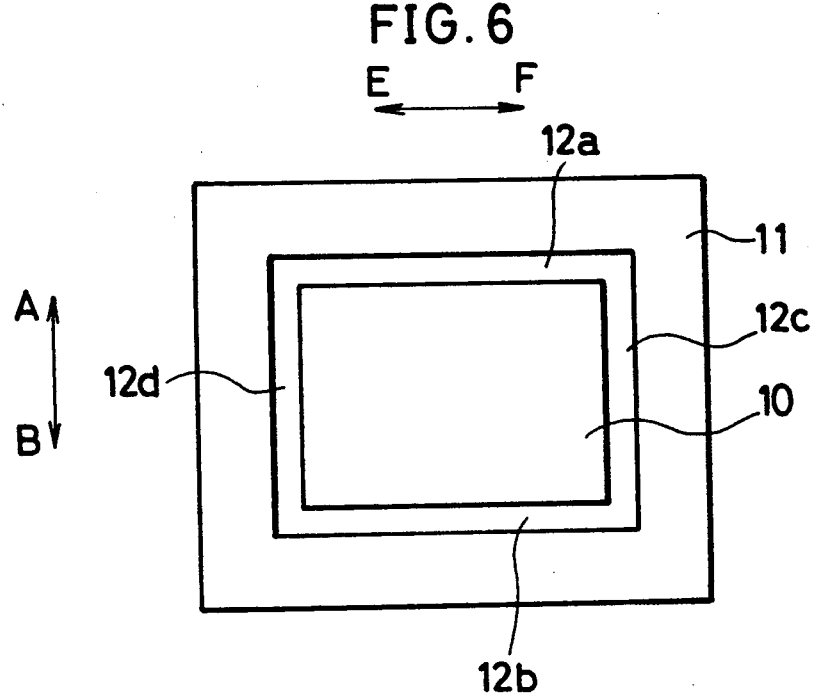
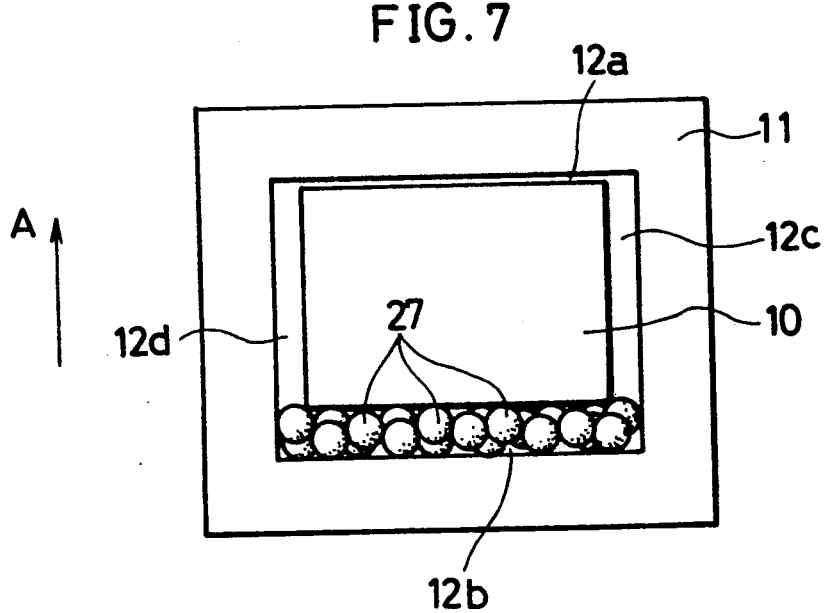

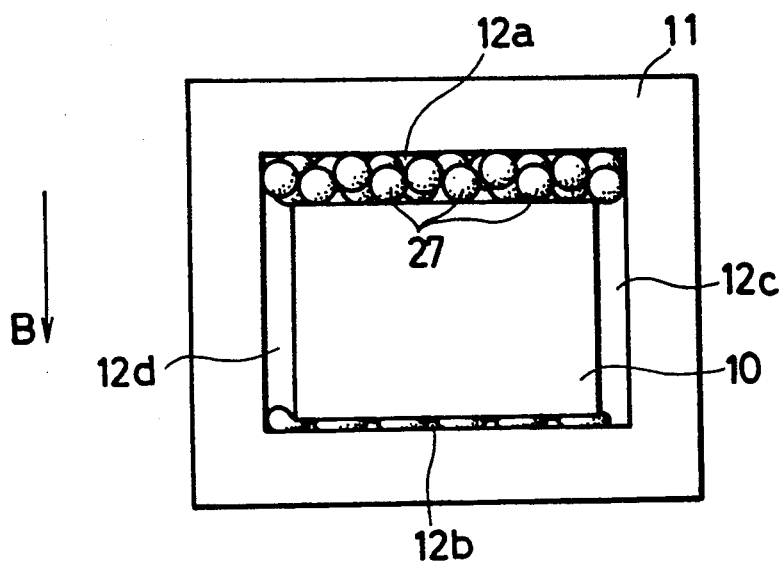
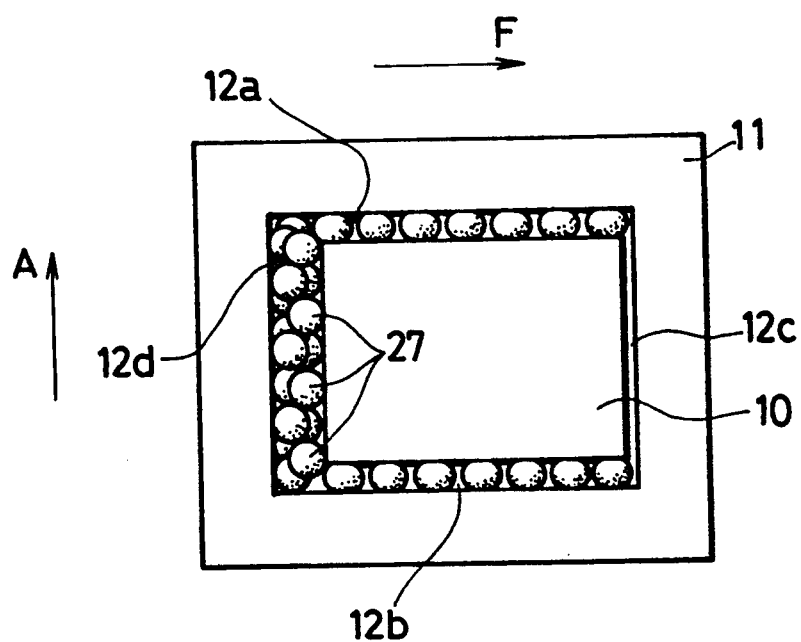

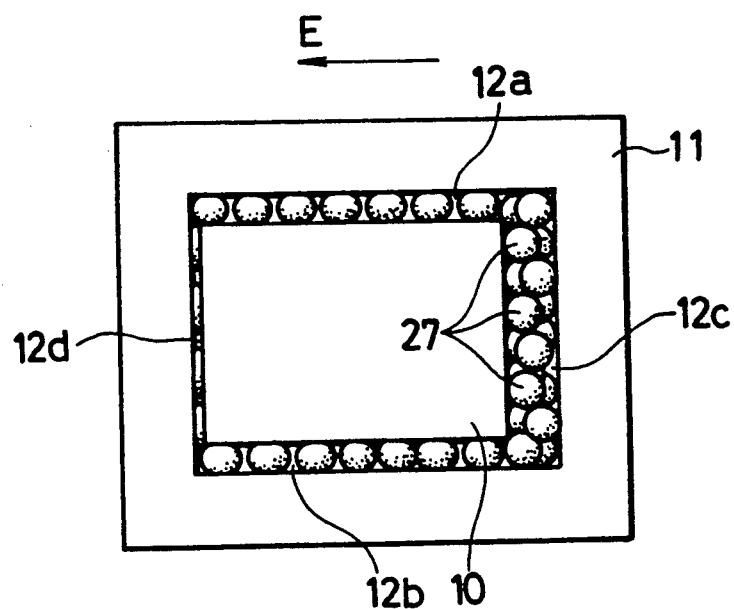
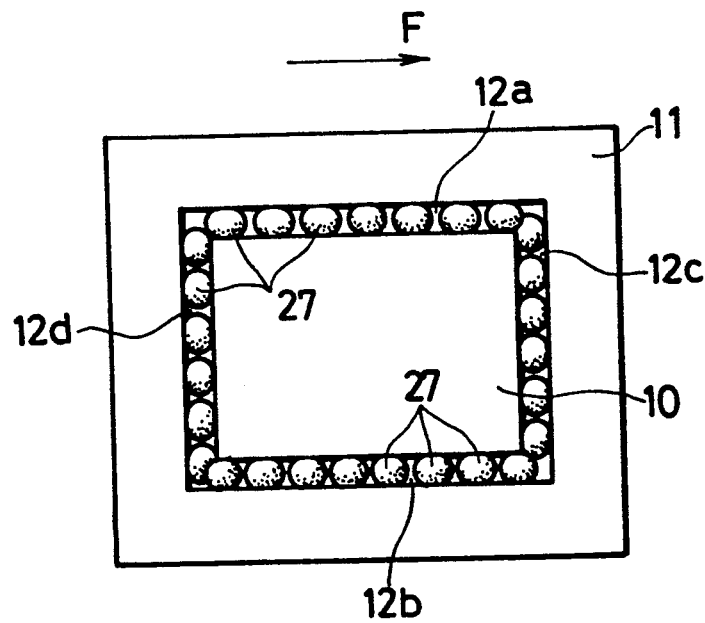

EXPANSION MOLDING METHOD

FIELD OF THE INVENTION

The present invention relates to an expansion molding method and apparatus for producing thin-walled molded articles of expanded material.

BACKGROUND OF THE INVENTION

According to a conventional expansion molding method and apparatus, the manufacture of molded articles of expanded resin includes the following steps: filling a cavity in a mold with expandable thermoplastic resin beads (hereinafter referred to as expandable resin beads) which have been expanded in advance to have a specified bead diameter; heating the expandable resin beads to be fused together; and cooling the resulting expandable resin beads to produce a molded article of expanded resin. Here, the cavity which becomes the external frame of the molded article is required to have a width (thickness) greater than the diameter of the pre-expanded expandable resin beads so that the cavity is filled up with the expandable resin beads.

Some molded articles are required to have thin walls for their uses. With the above-mentioned method and apparatus, however, when a cavity whose width is smaller than the diameter of a pre-expanded expandable resin bead, for example about 5 mm, is required, the cavity can not be filled with the expandable resin beads.

To overcome such a drawback, for example, Japanese Publication for Examined Patent Application No. 53-30741/1978 discloses an expansion molding method. In this method, as shown in FIG. 21 and FIG. 22, a cavity 53 formed between a male mold 51 and a female mold 52 is filled with expandable resin beads while partially expanding its capacity with adjusting members 54. Then, the expandable resin beads are compressed by the adjusting members 54 to reduce the capacity of the cavity 53. With this arrangement, it is possible to manufacture thin-walled molded articles of expanded resin by compressing the resin beads with the adjusting members 54 until the width of the cavity 53 becomes smaller.

This expansion molding method is effective when manufacturing molded articles of expanded resin having partially thin walls. However, the installation of the adjusting members 54 is difficult in the arrangement for producing molded articles which have, for example, consistently thin walls, and also causes a mold with a complicated structure. Moreover, when manufacturing molded articles which have, for instance, a cylindrical shape like cups, it is impossible to reduce the thickness of the side walls consistently with the adjusting members 54.

To solve such a problem, for example, Japanese Publication for Examined Patent Application No. 62-10175/1987 and Japanese Publication for Unexamined Patent Application No. 63-153119/1988 disclose expansion molding methods and apparatuses for producing molded articles of expanded resin which have consistently thin side walls.

More specifically, with the expansion molding method of Application No. 62-10175/1987, as illustrated in FIG. 23, cracking is arranged, i.e. the mold is closed while leaving a gap 56a between a male mold 55 and a female mold 56 when filling the cavity 57 with the expandable resin beads. Here, the width of the gap 56a is smaller than the diameter of an expandable resin bead, but the width of a cavity 57 formed between the male mold 55 and the female mold 56 is greater than the diameter of the expandable resin bead. After filling the cavity 57 with the expandable resin beads, the mold is completely closed. This process enables the cavity 57 to be sufficiently filled up with the expandable resin beads, and thereby reducing the thickness of the side wall.

Meanwhile, as illustrated in FIG. 24, the method and apparatus of Application No. 63-153119/1988 has a finish-forming mold for forming finished articles and a preforming mold for forming preformed articles which have a greater thickness compared to the finished articles. The finish-forming mold is composed of a male mold 61 and a female mold 59, while the preforming mold is composed of a male mold 60 and a female mold 58. When manufacturing molded articles, firstly preformed articles are formed by filling up the cavity in the preforming mold with expandable resin beads, and the preformed articles are then compressed in the finish-forming mold to reduce the wall thickness. This method also makes it possible to produce finished articles having consistently thin walls like the above-mentioned method of Application No. 62-10175/1987.

However, with the methods and apparatuses disclosed in the above-mentioned applications No. 62-10175/1987 and No. 63-153119/1988, after filling the cavity with expandable resin beads or producing the preformed article, the thickness of the molded article is reduced by moving the mold in the same direction as the closing direction. Therefore, the portions of the cavity, which become the walls of the molded article, to be thinned need to slope with respect to the closing direction.

For example, as shown in FIG. 25, when the side faces of circumference sections 64a of a cavity 64 formed between a male mold 62 and a female mold 63 extend parallel to a closing direction P, the widths of the circumference sections 64a will not change even when the above-mentioned cracking is performed, and therefore the circumference sections 64a can not be filled up with expandable resin beads 65. Besides, the process for forming a preformed article into a finished article in the finish-forming mold is infeasible as the external diameter of the preformed article is greater than the internal diameter of the opening of the finish-forming mold.

As describe above, with the conventional expansion molding methods and apparatuses, the thickness of the side walls is limited according to the diameter of expandable resin beads, preventing the use of expandable resin beads of great diameters. In addition, when forming molded articles having consistently thin side walls, requirements are, for example, the side walls need to slope imposed, thereby causing limited variations in shapes of the molded articles.

SUMMARY OF THE INVENTION

An object of the present invention is to provide an expansion molding method for producing molded articles of expanded resin, having partially or consistently thin walls independent of the diameter of resin beads, by using molds with a simple structure, which does not limit the variations in shapes of the molded articles.

Another object of the present invention is to provide an apparatus which is very suitable for carrying out the above-mentioned expansion molding method.

In order to achieve the above objects, an expansion molding method of the present invention including the steps of closing a compression mold composed of a movable mold and a fixed mold to form a cavity having at least one circumference section whose width is smaller than the diameter of an expandable thermoplastic resin bead while leaving a gap between the movable and fixed molds, filling the cavity with the expandable thermoplastic resin beads, further closing the compression mold so as to eliminate the gap between the movable and fixed molds and expanding the expandable thermoplastic resin beads by heating to produce a molded article, adopts the following procedures: Moving the movable mold and/or the fixed mold in at least one direction orthogonal to the closing direction when filling the cavity with the expandable thermoplastic resin beads. Separating the movable mold from the fixed mold so that the circumference section between the wall surfaces of the movable and fixed molds has a spatial width which is greater than the diameter of the expandable thermoplastic resin beads, and then filling the circumference section with the expandable thermoplastic resin beads. Moving the movable mold and/or the fixed mold again to have the normal-sized space between the above wall surfaces.

The movable mold and/or the fixed mold may be reciprocated in one orthogonal direction or in a plurality of orthogonal directions depending on the shape of the molded article. The movable mold and/or the fixed mold may also be moved in any orthogonal directions while making the corners between the adjacent circumference sections the lead.

The movements in the orthogonal directions may be performed eccentrically.

Moreover, in order to achieve the above objects, an expansion molding apparatus of the present invention has a compression mold composed of a movable mold and a fixed mold whereby a cavity having at least one circumference section whose width is smaller than the diameter of an expandable thermoplastic resin bead is formed when the compression mold is closed, further comprises moving means for moving the movable mold and/or the fixed mold in a direction orthogonal to the closing direction so that the space between the wall surfaces of the movable and fixed molds forming the circumference section has a width greater than the diameter of the expandable thermoplastic resin beads.

According to the above-mentioned method and apparatus, after closing the movable mold and the fixed mold, the movable mold and/or the fixed mold are moved in a direction orthogonal to the closing direction. At this time, the mold closing is carried out while leaving a gap between the movable mold and the fixed mold, thereby permitting the movable mold and/or the fixed mold to be smoothly moved in the orthogonal direction.

The movement in the orthogonal direction causes the wall surfaces of the movable and fixed molds constituting the circumference section of the cavity formed by the above-mentioned compression mold to be relatively separated so that the spatial width between the wall surfaces becomes greater than the diameter of the expandable thermoplastic resin beads. Therefore, even when the width of the circumference section of the cavity which becomes the side wall of the molded article is smaller than the diameter of the expandable resin beads, the circumference section is filled up with the expandable thermoplastic resin beads. Consequently, it is possible to produce molded articles of expanded resin having consistently thin side walls without limiting the variations in shapes of the molded articles, for example, the side walls of the molded articles do not necessarily slope.

For instance, when the cavity has a plurality of the parallel circumference sections at both sides, the circumference sections are filled with the expandable resin beads by one reciprocating motion in one orthogonal direction. When the cavity has a plurality of the circumference sections forming, for example, a quadrangle and a hexagon, all the circumference sections are filled with the expandable resin beads by reciprocating motions in a plurality of orthogonal directions.

In case the cavity has a plurality of the circumference sections in the shape of a polygon as above mentioned, they are filled up by reciprocating the movable mold while making the corners between the adjacent circumference sections the lead, allowing the movable mold to be moved in a reduced number of orthogonal directions.

Further, when the cavity has a circular-shaped or an elliptical-shaped circumference section, the circumference section is filled with the expandable resin beads by an eccentric movement in an orthogonal direction.

With the expansion molding apparatus of the present invention, the circumference sections are filled up by the use of only the moving means for moving the movable mold and/or the fixed mold in a direction orthogonal to the closing direction. Therefore, the compression mold does not require particular process, and thereby achieving a simple structure.

For a fuller understanding of the nature and advantages of the invention, reference should be made to the ensuing detailed description taken in conjunction with the accompanying drawings.

BRIEF DESCRIPTION OF THE DRAWINGS

FIG. 1 to FIG. 20 illustrate one embodiment of the present invention.

FIG. 1 is a schematic front view illustrating an expansion molding apparatus.

FIG. 2 to FIG. 5 are explanatory views illustrating a process of filling parallel circumference sections with expandable resin beads.

FIG. 6 to FIG. 11 are explanatory views illustrating a process of filling circumference sections in the shape of a quadrangle with the expandable resin beads.

FIG. 12 and FIG. 13 are explanatory views illustrating a process of filling circumference sections with the expandable resin beads by moving a movable mold while making corners the lead in moving directions.

FIG. 14 to FIG. 17 are explanatory views illustrating a process of filling circumference sections in the shape of a polygon with the expandable resin beads.

FIG. 18 to FIG. 20 are explanatory views illustrating a process of filling a ring-shaped circumference section with the expandable resin beads.

FIG. 21 and FIG. 22 are explanatory views illustrating a process of filling a cavity with expandable resin beads.

FIG. 23 is an explanatory view illustrating the shape of a cavity.

FIG. 24 is a schematic cross sectional view illustrating a compression mold of an expansion molding apparatus.

FIG. 25 is an explanatory view illustrating a state in which a cavity is filled up with expandable resin beads.

DETAILED DESCRIPTION OF THE PREFERRED EMBODIMENTS

Referring to FIG. 1 to FIG. 20, the following will describe one embodiment of the present invention.

Figure 1:
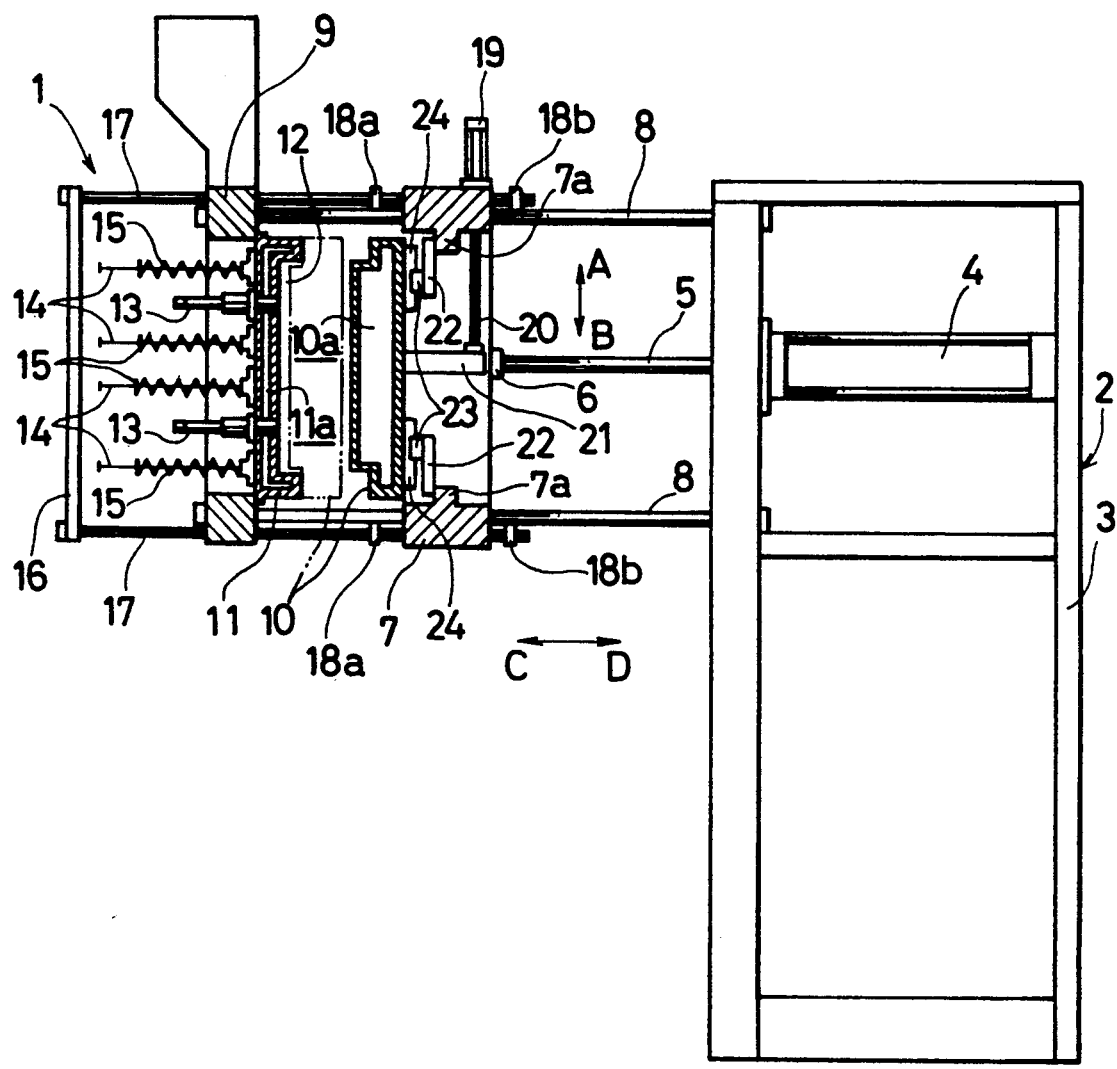

As illustrated in FIG. 1, an expansion molding apparatus of the present invention for producing molded articles of expanded material (hereinafter referred to as molded articles) has a main body 1 and a supporting unit 2 for supporting the main body 1. The supporting unit 2 is composed of a frame 3 built, for example, of angle steels and a cylinder 4 installed in the frame 3.

The cylinder 4 is horizontally mounted in the center of the upper section of the supporting unit 2. A piston rod 5 that is a moving member of the cylinder 4 is fixed to one of the side faces of a movable frame 7 through a flange 6 mounted on the leading end of the piston rod 5. The movable frame 7 that constitutes the main body 1 has a plurality of slidable tie-bars 8 which extend through the edges of the movable frame 7. One end of each tie-bar 8 is fixed to the frame 3, while the other end is fixed to a fixed frame 9 that is disposed in a position opposite to the movable frame 7. This arrangement enables the movable frame 7 to be moved to any positions in the C direction and D direction with the piston rod 5 of the cylinder 4.

Figure 2:
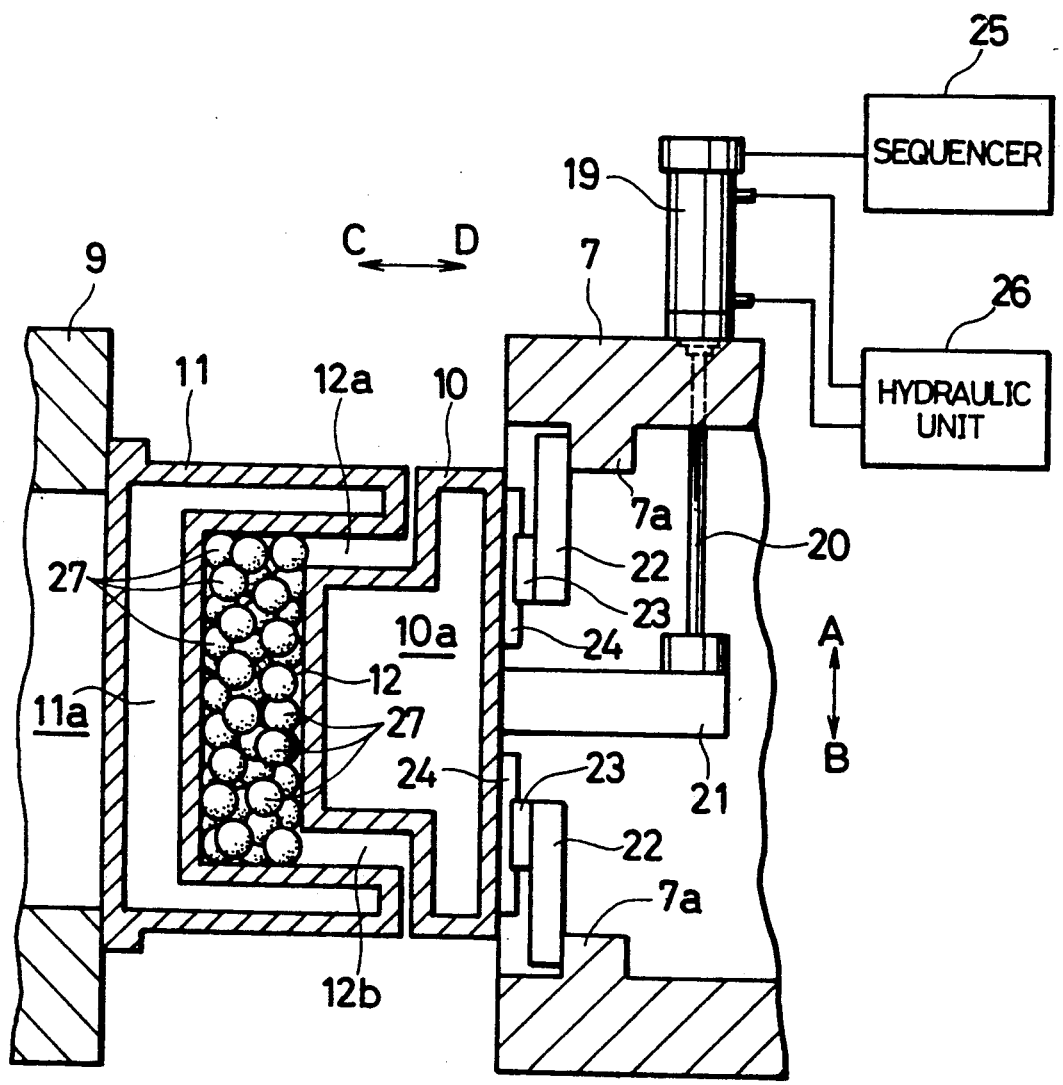

The other side face of the movable frame 7 is provided with a movable male mold 10. When the piston rod 5 fully extends in the C direction, the male mold 10 joins a female mold 11, thereby forming a cavity 12, i.e. a hollow space of the same shape as the molded article. As illustrated in FIG. 2, the cavity 12 has circumference sections 12a and 12b which become side walls of the molded article at both sides. The circumference sections 12a and 12b are formed between the side wall of the female mold 11 and that of the male mold 10, and their widths are determined so as to be smaller than the diameter of an expandable thermoplastic resin bead 27 (hereinafter referred to as expandable resin bead 27).

As illustrated in FIG. 1, hollow spaces 10a and 11a are respectively formed inside the male mold 10 and female mold 11 constituting the compression mold. The hollow spaces 10a and 11a are connected with a vacuum pipe, steam pipe and drain pipe, none of them are shown. Meanwhile, the faces of the male mold 10 and female mold 11 forming the cavity 12 are provided with a number of vents. These vents enable the introduction, suction and draining of steam and air as heating media to/from the cavity 12 through the hollow spaces 10a and 11a and the respective pipes.

Further, the female mold 11 is provided with filling devices 13 connected with a hopper and the other devices. The filling devices 13 extend to the cavity 12 through the female mold 11, and whereby the cavity 12 is filled with expandable resin beads contained in the hopper. Pre-expanded beads (Pioceran Beads of POSP type manufactured by Sekisui Kaseihin Kogyo Co., LTD) which were copolymer of polyethylene and styrene were used as expandable resin beads. For example, the expansion factor and diameter of the expandable resin bead are presented in Table 1.

TABLE 1

| Type | Expansion Factor | Diameter of Bead (mm) |
|---|---|---|
| POSP | 50 | 5.1–5.5 |
|  | 40 | 4.6–5.0 |
|  | 30 | 4.3–4.7 |

TABLE 1-continued

| Type | Expansion Factor | Diameter of Bead (mm) |
|---|---|---|
|  | 20 | 3.7–4.1 |

As for expandable resin beads, olefin resins such as polyethylene, polypropylene and copolymer made mainly of polyethylene and polypropylene, styrene resins made mainly of polystyrene and styrene, polyvinyl chloride resin and other types of thermoplastic resins may also be used.

The female mold 11 provided with the filling devices 13 has movable eject pins 14 for extruding an article molded in the cavity 12 from the female mold 11. Four eject pins are provided for one cavity 12.

Each of the eject pins 14 is provided with a spring 15. At the vicinity of one ends of the eject pins 14 is disposed an eject plate 16 which can come into contact with the ends. One ends of eject bars 17 are fastened to both edges of the eject plate 16, respectively. The eject bars 17 move the eject plate 16 in the C direction and D direction.

The eject bars 17 are slidably mounted to extend through the fixed frame 9 and movable frame 7. The ejects bars 17 are placed outside the tie-bars 8. A first contacting member 18a and a second contacting member 18b are mounted on each of the eject bars 17 with the movable frame 7 between. When the movable frame 7 is moved in the C direction, it comes into contact with the first contacting members 18a, while when it is moved in the D direction, it comes into contact with the second contacting members 18b.

With this arrangement, when the movable frame 7 that has made contact with the second contacting members 18b is further moved in the D direction, the eject plate 16 comes into contact with the eject pins 14. As a result, the eject plate 16 moves the eject pins 14 in the D direction, and which causes a molded article to be extruded from the female mold 11. Meanwhile, when the movable frame 7 that has made contact with the first contacting members 18a is further moved in the C direction, the eject plate 16 comes out of contact with the eject pins 14 and simultaneously the eject pins 14 are moved in the C direction by the springs 15. At this time, a stopper (not shown) stops the eject pins 14 so that their ends form a uniform face with the face of the female mold 11 of the cavity 12 side.

As illustrated in FIG. 2, on the upper face of the movable frame 7 is mounted a cylinder 19. The cylinder 19, a movement delivering member 21, guide rails 24 and inner plates 22 to be described later constitute moving means. The movement delivering member 21 is mounted on the side face of the male mold 10 of the supporting unit 2 side as illustrated in FIG. 1. The leading end of a piston rod 20 of the cylinder 19 is fixed to the movement delivering member 21. Therefore, the cylinder 19 can move the male mold 10 through the movement delivering member 21 in the A direction and B direction orthogonal to the closing direction.

A hydraulic unit 26 and control means, for example, a sequencer 25 are connected with the cylinder 19, and the sequencer 25 is also connected with a plurality of positioning sensors (not shown). These positioning sensors detect the position of the male mold 10 in the vertical direction. According to a detection signal from the positioning sensors, the sequencer 25 controls the amount of oil supplied to the cylinder 19 from the oil hydraulic unit 26, whereby the piston rod 20 is moved to and stopped at a given position.

The movable frame 7 provided with the cylinder 19 has protrusions 7a formed on the faces thereof facing the movement delivering member 21. One ends of the inner plates 22 are secured to the protrusions 7a, while the other ends of the inner plates 22 are fixed to linear guides 23. These linear guides 23 slidably engage with the guide rails 24. The guide rails 24 are mounted on the side face of the male mold 10 such that the axial direction of the piston rod 20 is equal to the longitudinal direction of the guide rails 24. Accordingly, the linear guides 23 and the guide rails 24 can prevent vibrations from occurring when the male mold 10 is moved.

The following will discuss an expansion molding method employed by the above-mentioned apparatus while explaining the operations of the apparatus.

As illustrated in FIG. 2, firstly the movable frame 7 is moved in the C direction to close the compression mold but leaving gaps between the male mold 10 and the female mold 11 from which expandable resin beads can not come out. In brief, the cavity 12 of a so-called cracking state is formed. Then, expandable resin beads 27 which have been expanded by 20 to 50 times in advance to have a bead diameter in the range from 3.7 mm to 5.5 mm are supplied to the cavity 12 by the filling devices 13 shown in FIG. 1. The cavity 12 is filled with the expandable resin beads 27 while discharging air through the gaps between the male mold 10 and the female mold 11. At this time, when the widths of the circumference sections 12a and 12b of the cavity 12 which become the side walls of the molded article are smaller than a diameter of the expandable resin beads 27, ranging from 3.7 mm to 5.5 mm, the expandable resin beads 27 can not enter the circumference sections 12a and 12b.

Figure 3:
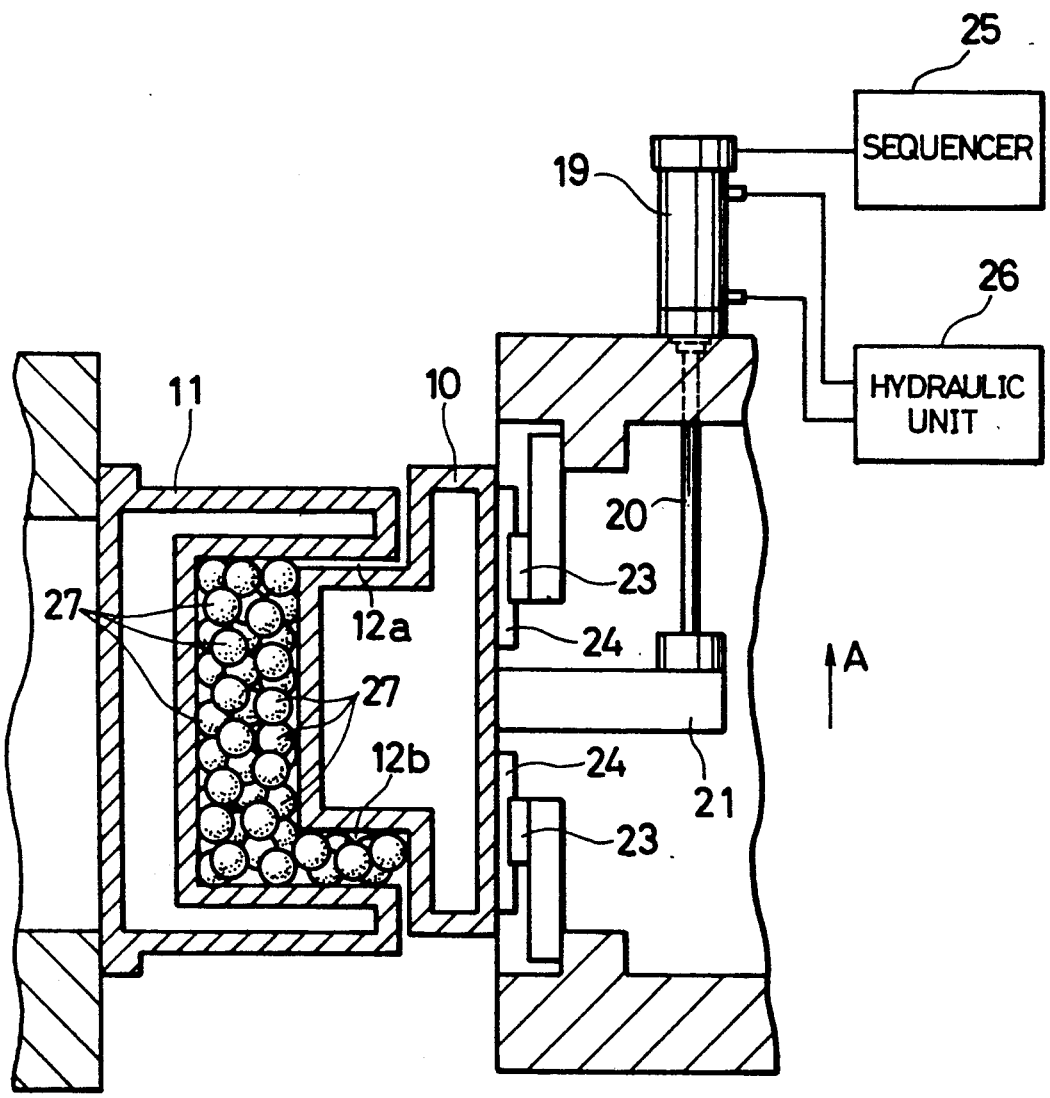

Next, upon receiving a suction instruction signal from the sequencer 25, oil in the suction direction is supplied to the cylinder 19 from the hydraulic unit 26. Accordingly, the cylinder 19 moves the piston rod 20 in the A direction as shown in FIG. 3. When the movement of the piston rod 20 is delivered to the male mold 10 through the movement delivering member 21, the male mold 10 is also moved in the A direction as it is slidable due to the guide rails 24 and the linear guides 23.

The movement of the male mold 10 in the A direction is observed by a positioning sensor (not shown). A detection signal is sent to the sequencer 25 from the positioning sensor at a point where the width of the circumference section 12a on the moving direction side is, for example, 1 mm and the width of the opposite circumference section 12b is, for example, 7 mm which is greater than the diameter of the expandable resin beads 27. Upon receiving the detection signal, the sequencer 25 cancels the suction instruction signal to stop the supply of oil from the hydraulic unit 26 to the cylinder 19, and the piston rod 20 is then stopped and held at the position. In consequence, the 7 mm-wide circumference section 12b is filled with the expandable resin beads 27 of a bead diameter between 3.7 mm and 5.5 mm.

Figure 4:
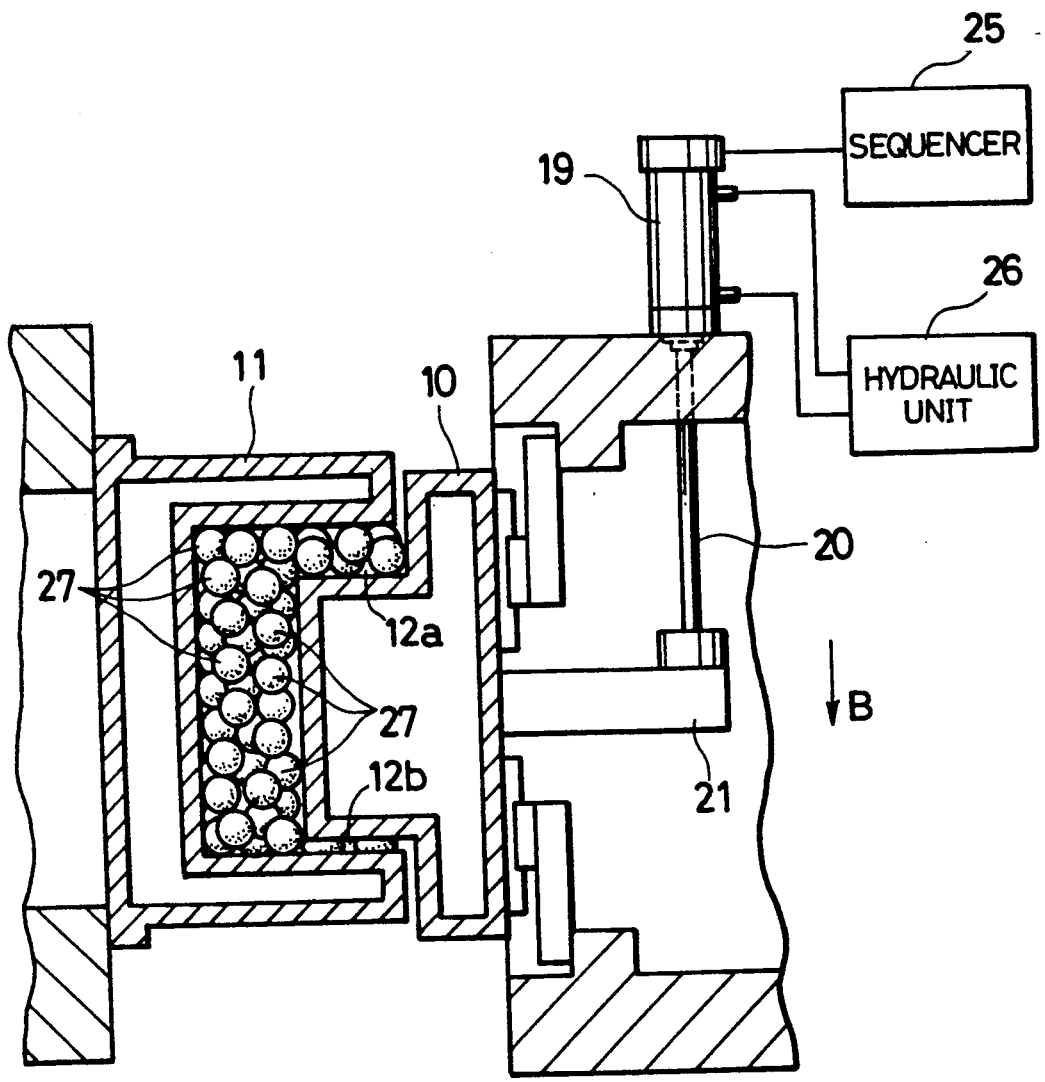

After filling the circumference section 12b with the expandable resin beads 27 and upon receiving an extrusion instruction signal from the sequencer 25, as illustrated in FIG. 4, the hydraulic unit 26 supplies oil in the extrusion direction to the cylinder 19, or oil in the cylinder 19 is fed back to to the hydraulic unit 26. Accordingly, the cylinder 19 moves the piston rod 20 in the B direction. This movement of the piston rod 20 is delivered to the male mold 10 through the movement delivering member 21, and which causes the male mold 10 to be moved in the B direction. At this time, the circumference section 12b maintains a state of being filled up with the expandable resin beads 27 as the expandable resin beads 27 containing a number of bubbles can change their forms according to the width of the circumference section 12b.

The movement of the male mold 10 in the B direction is observed by a positioning sensor (not shown). A detection signal is sent to the sequencer 25 from the positioning sensor at a point where the width of the circumference section 12b on the moving direction side is, for example, 1 mm and the width of the opposite circumference section 12a is, for example, 7 mm which is greater than the diameter of the expandable resin beads 27. Upon receiving the detection signal, the sequencer 25 cancels the extrusion instruction signal to stop the supply of oil from the hydraulic unit 26 to the cylinder 19, and the piston rod 20 is then stopped and held at the position. In consequence, the 7 mm-wide circumference section 12a is filled with the expandable resin beads 27 of a bead diameter between 3.7 mm to 5.5 mm.

Figure 5:
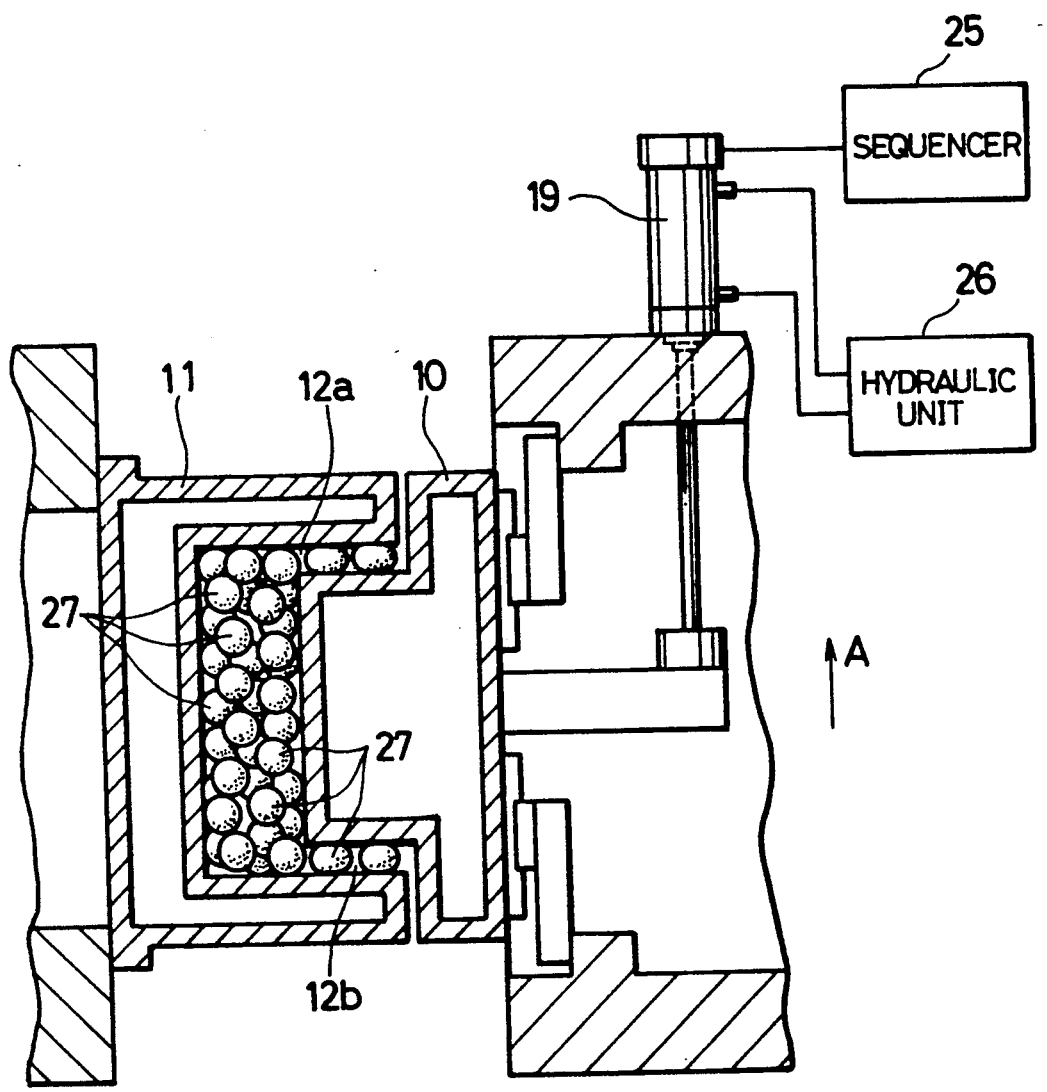

As illustrated in FIG. 5, after filling the circumference section 12a with the expandable resin beads 27 and upon receiving a suction instruction signal from the sequencer 25, the hydraulic unit 26 supplies oil in the suction direction to the cylinder 19. The cylinder 19 moves the piston rod 20 in the A direction. This movement is observed by the positioning sensor. When the male mold 10 reaches a normal position where the widths of the circumference sections 12a and 12b equal the side wall thickness of the molded article, it is stopped at the position.

Therefore, the circumference sections 12a and 12b formed by the normally positioned male mold 10 and female mold 11 are filled with the expandable resin beads 27 of a bead diameter greater than the widths of the circumference sections 12 and 12b while changing the form of the expandable resin beads 27. After the male mold 10 is further moved to eliminate the gaps between the male mold 10 and female mold 11, the expandable resin beads 27 are heated with, for example, steam to expand, thereby producing the molded article.

According to this embodiment, as illustrated in FIG. 1, the male mold 10 is moved in the A direction and B direction orthogonal to the closing direction by the cylinder 19 fixed to the movable frame 7. However, this is not an exclusive example, so the male mold 10 can be moved in any direction if it is orthogonal to the closing direction.

For instance, when the cavity 12 has only one circumference section 12a, the filling is completed with one movement in a single direction. Moreover, as illustrated in FIG. 6, when the cavity 12 formed between the male mold 10 and the female mold 11 have, in addition to the circumference sections 12a and 12b formed at upper and lower sides, circumference sections 12c and 12d formed right and left sides, the male mold 10 needs to be moved in a horizontal direction, i.e. in the E direction and F direction as well as a vertical direction, i.e. in the A direction and B direction.

The above operation will be explained below. As illustrated in FIG. 7, firstly, the male mold 10 is moved in the A direction, whereby the lower circumference section 12b of an increased width is filled with the expandable resin beads 27. Secondly, as illustrated in FIG. 8, the male mold 10 is moved in the B direction, whereby the upper circumference section 12a of an increased width is filled with the expandable resin beads 27.

Next, as illustrated in FIG. 9, the male mold 10 is moved in the A direction to be returned to the normal position and is then moved in the F direction, whereby the circumference section 12d of an increased width is filled with the expandable resin beads 27. Then, the male mold 10 is moved in the E direction as illustrated in FIG. 10, whereby the circumference section 12c of an increased width is filled with the expandable resin beads 27. Lastly, as illustrated in FIG. 11, the male mold 10 is moved in the F direction to be returned to the normal position.

When a series of the operations are completed, all the circumference sections 12a, 12b, 12c and 12d are filled with the expanded resin beads 27.

Figure 12:
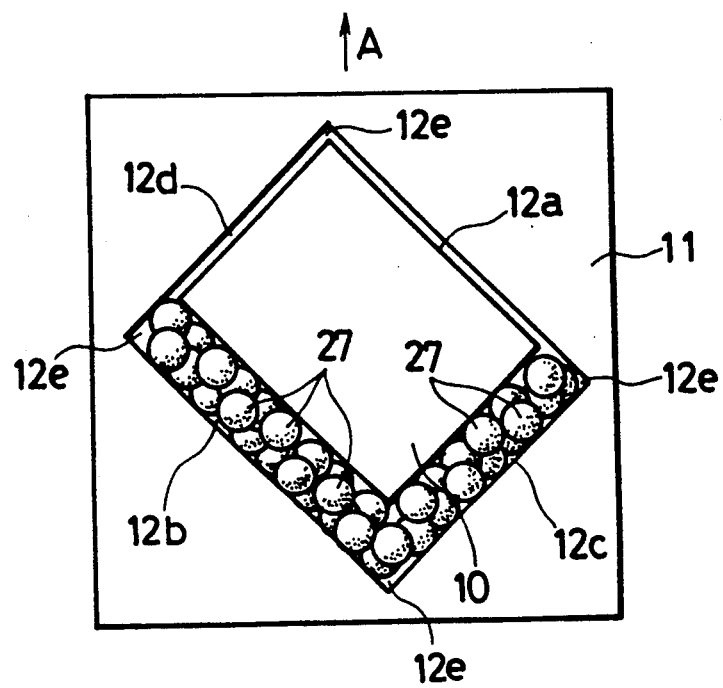
Figure 13:
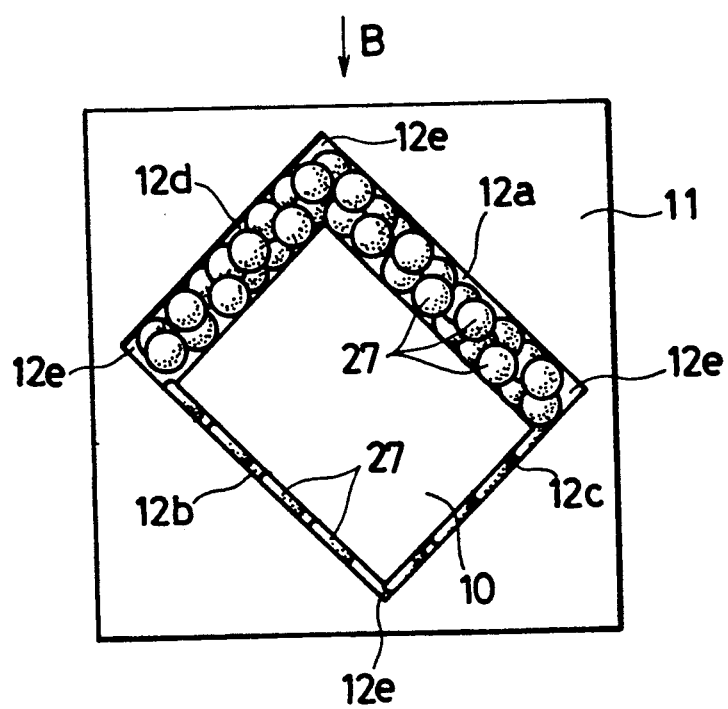

Besides, in the case of employing the female mold 11 and the male mold 10 forming the circumference sections 12a, 12b, 12c and 12d, as shown in FIG. 12, the male mold 10 may also be moved while making any of corners 12e the lead. At the corner 12e, adjacent circumference sections meet. In this case, for example when the male mold 10 is moved in the A direction, firstly the circumference sections 12b and 12c of increased widths are filled with the expandable resin beads 27. Then, as illustrated in FIG. 13, the male mold 10 is moved in the B direction, whereby the circumference sections 12a and 12d of increased widths are filled with the expandable resin beads 27. This arrangement enables all the circumference sections 12a, 12b, 12c and 12d to be filled up by two imperative operations.

The cavity 12 above-mentioned has the circumference sections in the shape of a quadrangle when it is viewed from the closing direction, however, triangle, pentagon and other polygon shapes may also be employed as the circumference sections can be filled with the expandable resin beads by the movement of the male mold.

Figure 14:
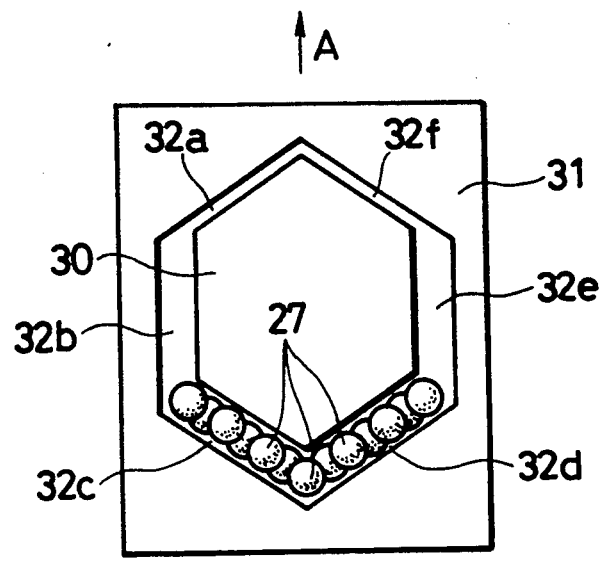
Figure 15:
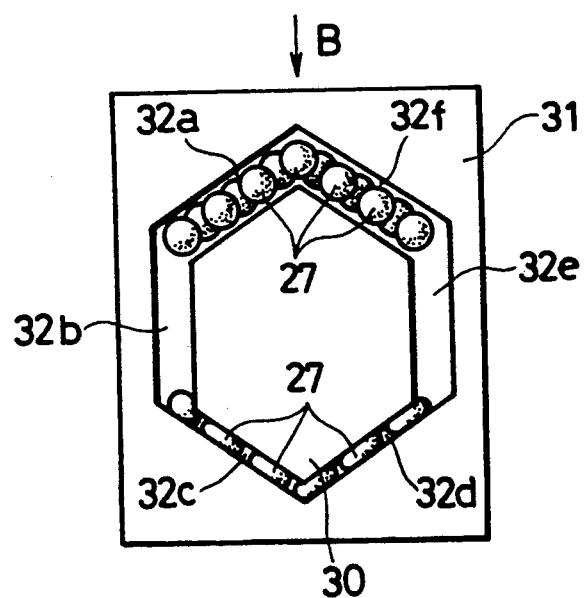
Figure 16:
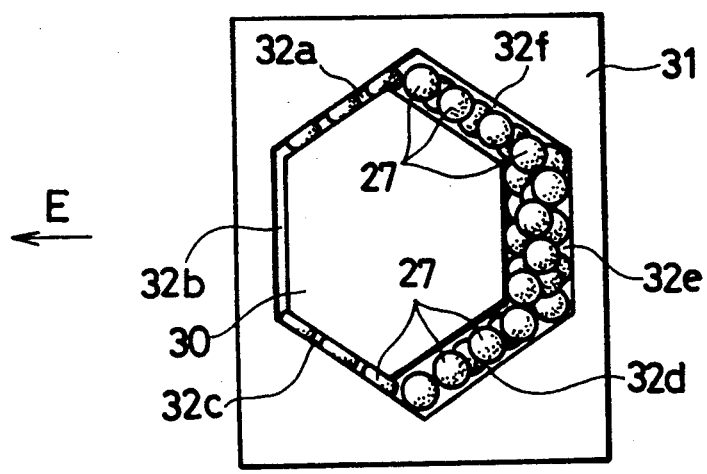
Figure 17:
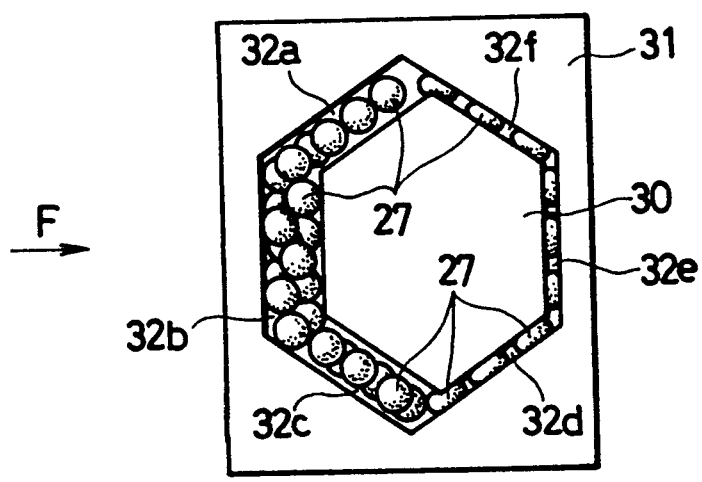

More specifically, as illustrated in FIG. 14, in the case of using a female mold 31 and a male mold 30 forming a hexagon cavity which has circumference sections 32a, 32b, 32c, 32d, 32e and 32f, firstly the male mold 30 is moved in the A direction to fill the circumference sections 32c and 32d of increased widths with the expandable resin beads 27. Secondly, as illustrated in FIG. 15, the male mold 30 is moved in the B direction, whereby the circumference sections 32a and 32f of increased widths are filled with the expandable resin beads 27. Next, as illustrated in FIG. 16, the male mold 30 is moved in the E direction, whereby the circumference section 32e of an increased width is filled with the expandable resin beads 27. Then, as illustrated in FIG. 17, the male mold 30 is moved in the F direction, whereby the circumference section 32b of an increased width is filled with the expandable resin beads 27.

Figure 18:
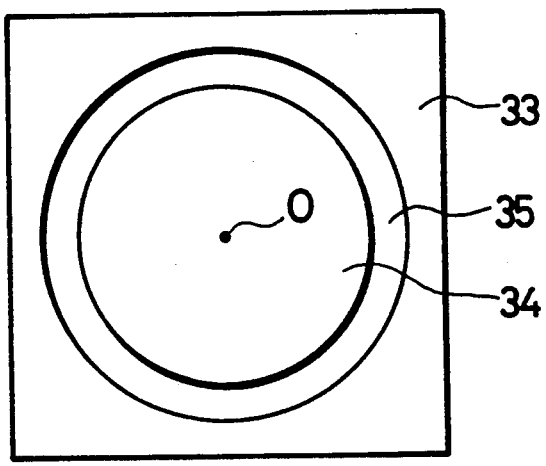
Figure 19:
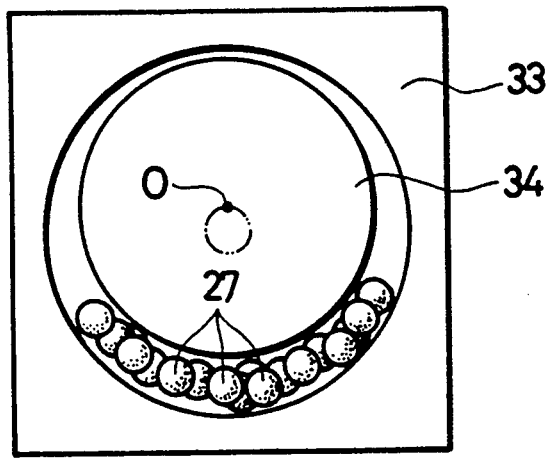
Figure 20:
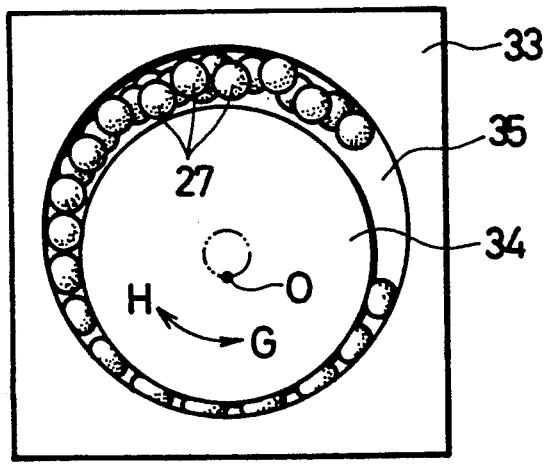
Figure 21:
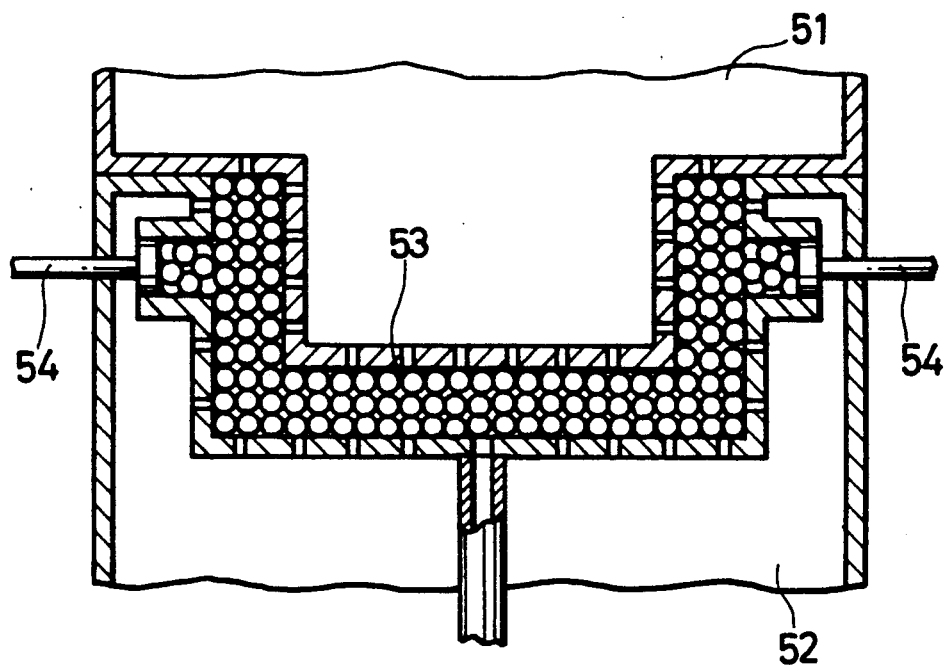
FIG. 21 to FIG. 25 illustrate conventional examples.
Figure 22:
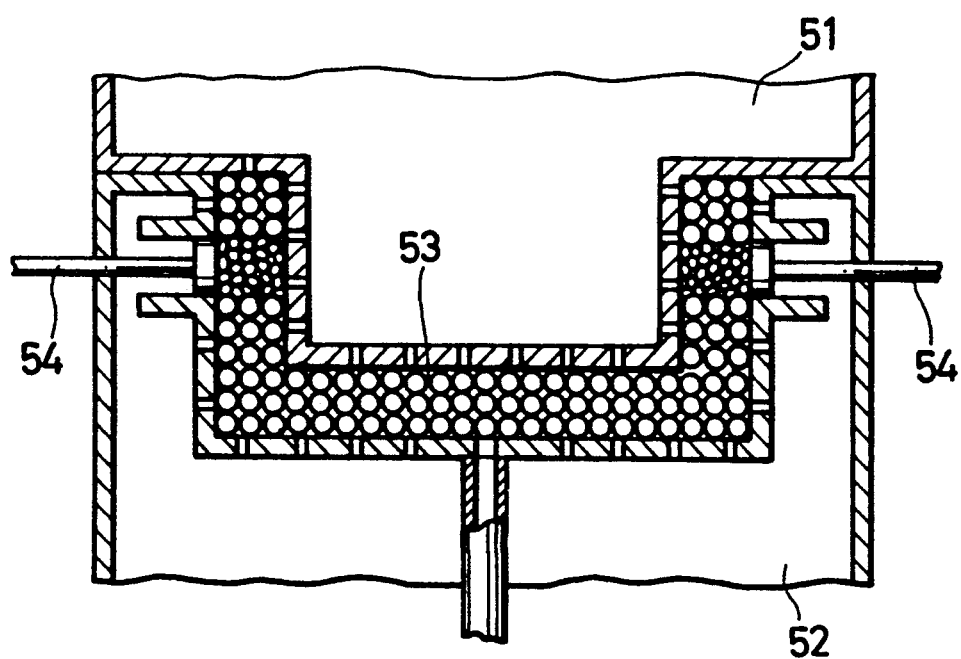
Figure 23:
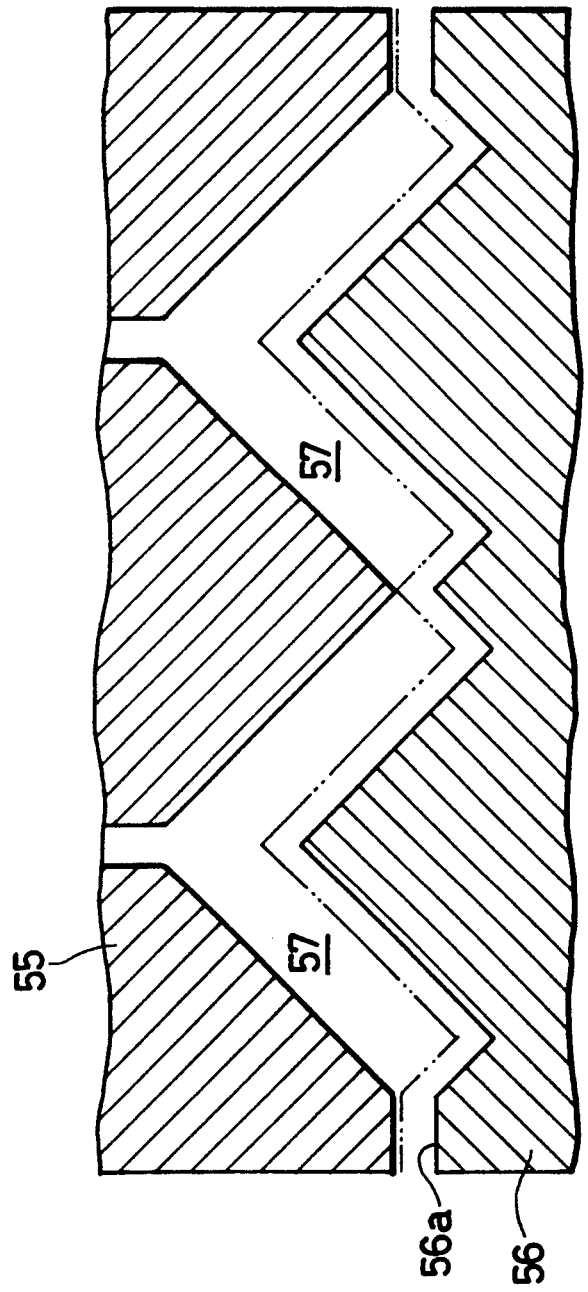
Figure 24:
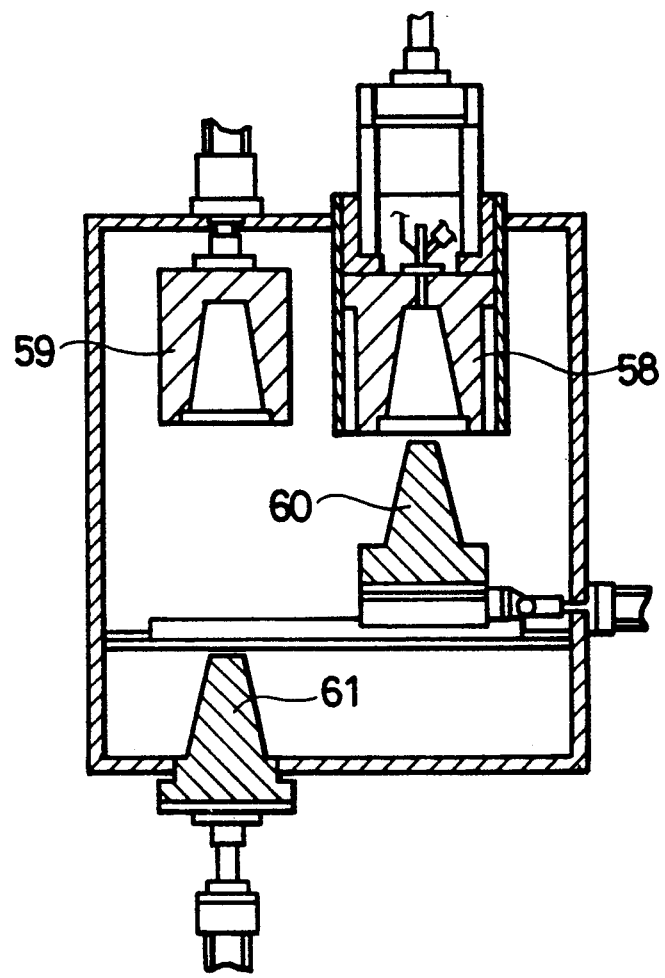
Figure 25:
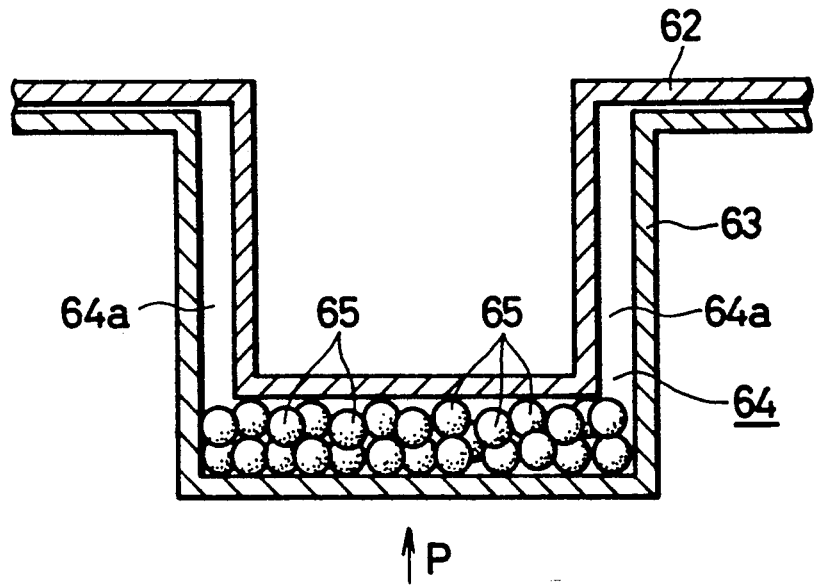

Further, as illustrated in FIG. 18, it is also possible to fill a cavity, which has a ring-shaped circular or elliptical circumference section 35 like the side wall of a cup when it is seen from the closing direction, with the expandable resin beads 27 by the movements of the male mold 34. For example, in the case of employing a female mold 33 and the male mold 34 forming the cavity with the circular circumference section 35, as illustrated in FIG. 19, firstly the center point O of the male mold 34 is moved to a position shown by the two dot chain line in the figure. Secondly, as illustrated in FIG. 20, the center point O is eccentrically moved in the G direction or H direction. With these operations, the circumference section 35 is filled with the expandable resin beads 27.

As described above, in manufacturing molded articles with the expansion molding method and apparatus according to this embodiment, as shown in FIG. 2, the cavity 12 can be sufficiently filled up with expandable resin beads even when the widths of the circumference sections 12a and 12b are smaller than the diameter of the expandable resin beads. Thus, the presence of the circumference sections 12a and 12b does not limit the variations in shapes of the molded articles. In addition, with this expansion molding apparatus, the male mold 10 needs to be simply moved in a direction orthogonal to the closing direction. Therefore, the male mold 10 does not require particular process, achieving a simple structure.

Also, in this embodiment, the male mold 10 is provided with the movable frame 7 so that it is movable, while the female mold 11 is provided with the fixed frame 9 so that it is stationary. However, the present invention is not restricted to this example, so either of the male mold 10 or the female mold 11 is arranged to be movable or stationary by mounting either of them on the movable frame 7 or the fixed frame 9.

Moreover, the moving means composed of the cylinder 19, the movement delivering member 21, etc. may be mounted on any of the movable frame 7, fixed frame 9, male mold 10 and the female mold 11 if the male mold 10 and the female mold 11 can be moved in a relative manner. For instance, in case there are a plurality of moving means, the male mold 10 and the female mold 11 are arranged so that both of them are movable. Any means other than the cylinder 19 can be used as moving means if the female mold 11 and the male mold 10 are moved in a relative manner. For example, chain driven by motor may be employed.

The guide rails 24 mounted on the male mold 10 are designed to slide along the linear guides 23 which are secured to the protrusions 7a of the movable frame 7 through the inner plates 22. However, this is not a restricted structure, so the inner plates 22 may be arranged to slide along the protrusions 7a. This arrangement permits the compression mold to be used for general purposes.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An expansion molding method for producing molded articles of expandable thermoplastic resin beads, comprising the steps of:
   providing a compression mold having a movable mold and a fixed mold, said molds being movable relative to each other in a closing direction and movable in orthogonal directions relative to said closing direction such that a distance in an orthogonal direction between opposed surfaces of the movable mold and surfaces of the fixed mold can be varied;
   moving said movable mold and said fixed mold relative to each other in said closing direction to a first position to form a cavity having at least one circumference section where said distance is smaller than a diameter of the expandable thermoplastic resin beads;

filling the cavity except said at least one circumference section with the expandable thermoplastic resin beads;

moving at least one of said movable and fixed molds from said first position in at least one direction orthogonal to said closing direction within said cavity so that said distance in said at least one circumference section is greater than the diameter of the expandable thermoplastic resin beads;

filling the circumference section with the expandable thermoplastic resin beads;

moving at least one of said movable and fixed molds in a direction opposite from said at least one direction orthogonal to said closing direction wherein said molds are returned to said first position, thereby compressing the expandable thermoplastic resin beads in said circumference section; and expanding the expandable thermoplastic resin beads by heating to produce a molded article.

2. The expansion molding method as defined in claim 1, wherein at least one of said movable and fixed molds is reciprocated in only one orthogonal direction.

3. The expansion molding method as defined in claim 1, wherein at least one of said movable and fixed molds is reciprocated in a plurality of different orthogonal directions.

4. The expansion molding method as defined in claim 1, wherein at least one of said movable and fixed molds is reciprocated in said at least one direction orthogonal to said closing direction towards a corner between adjacent circumference sections.

5. The expansion molding method as defined in claim 1, wherein at least one of said movable and fixed molds is moved eccentrically in the orthogonal direction.

* * * * *